Dec. 11, 1934.  T. RITCHIE  1,984,033
VIBRATION ABSORBER FOR STEERING WHEELS
Filed July 10, 1933
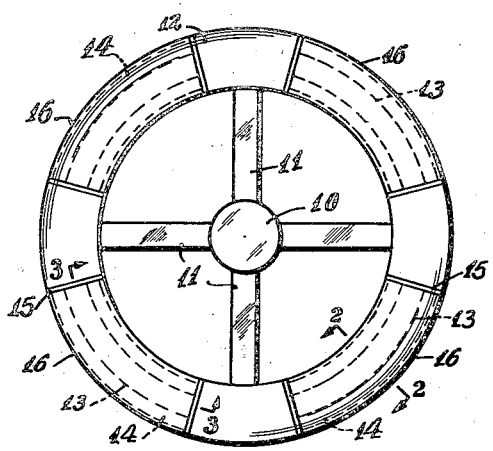
Fig. 1.
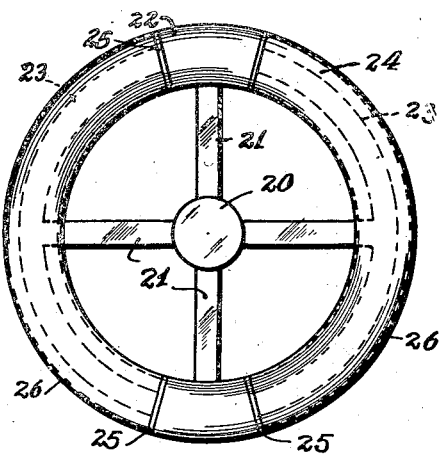
Fig. 6.
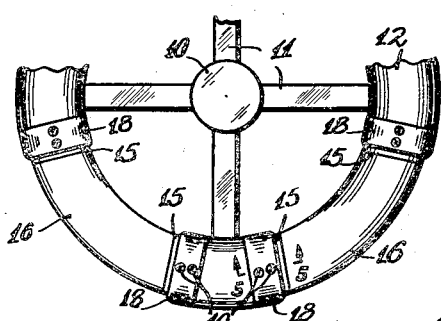
Fig. 4.
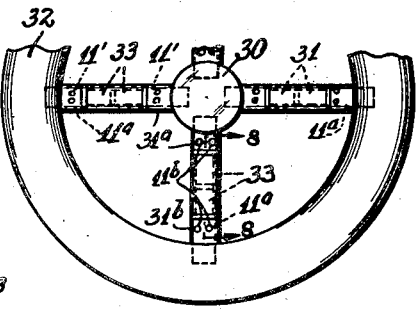
Fig. 7.
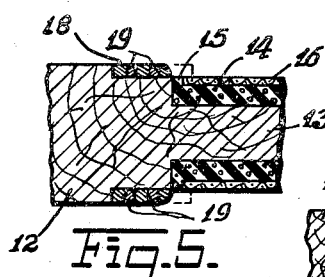
Fig. 5.
Fig. 2.
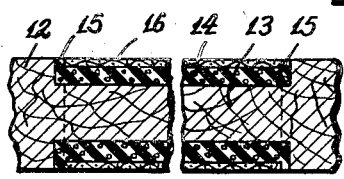
Fig. 3.
Fig. 8.
INVENTOR
THOMAS RITCHIE
BY
ATTORNEY Patented Dec. 11, 1934

1,984,033

UNITED STATES PATENT OFFICE 1,984,033

VIBRATION ABSORBER FOR STEERING WHEELS

Thomas Ritchie, Locust Valley, N. Y.

Application July 10, 1933, Serial No. 679,649

1 Claim. (Cl. 74—557)

This invention relates to new and useful improvements in a vibration absorber for steering wheels.

The invention has for an object the provision of sponge rubber material upon certain portions of the steering wheel of a vehicle or the like so as to prevent vibrations from the motor or other sources to be transmitted to the hands of a person steering the device.

Still further the invention proposes arranging the sponge rubber at various advantageous locations to accomplish the purpose desired and at the same time not to weaken the structure of the steering wheel.

Still further the invention proposes incorporating the sponge rubber vibration absorber upon the rim portion of the steering wheel.

Furthermore as another object of this invention it is proposed to construct the rim portion of a steering wheel to have several reduced areas, to arrange sponge rubber in the form of bushings upon said reduced areas, and to further arrange covering material over the sponge rubber in a manner so that the covering material may be held to operate the steering wheel, the sponge rubber acting to prevent the transmission of vibrations to the hands of a person operating the steering wheel.

Still further the invention contemplates arranging the sponge rubber bushings to have end flanges disposed between the edges of the covering material and the shoulders of the reduced portions of the rim in a manner so as to prevent contact between these parts which would allow transmission of some of the vibrations.

Another one of the objects of this invention is the provision of means for rigidly connecting the covering material with the adjacent portion of the rim so as to join these parts in a rigid unit in the event that the resilient material disintegrates to a degree so that the covering material would be loose.

Still further this invention contemplates arranging the sponge rubber vibration absorber upon the spokes of the steering wheel in a manner so as to prevent the vibrations from reaching the rim.

As another object of this invention it is proposed to construct a device as mentioned which is simple and durable and which may be manufactured and sold at a reasonable cost.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a plan view of a steering wheel constructed according to this invention.

Fig. 2 is a sectional view taken on the line 2—2 of Fig. 1.

Fig. 3 is a sectional view taken on the line 3—3 of Fig. 1.

Fig. 4 is a fragmentary plan view of a steering wheel constructed according to a modification of the invention.

Fig. 5 is a sectional view taken on the line 5—5 of Fig. 4.

Fig. 6 is a view similar to Fig. 1 but illustrating another embodiment of the invention.

Fig. 7 is a view similar to Fig. 4 but illustrating another modified form.

Fig. 8 is a sectional view taken on the line 8—8 of Fig. 7.

The steering wheel according to this invention comprises a hub portion 10 for connection with the steering column mechanism, which is connected by spring spokes 11 with a rim portion 12. The rim portion 12 has several reduced areas 13 located at points where the steering wheel is normally gripped by an operator. Each of the reduced areas has a sponge rubber vibration absorption member 14 in the form of a bushing engaged thereon. Each member 14 is formed at the ends with flanges 15 which have their outside diameters or shapes corresponding with the outside diameter or shape of the rim 12 at portions not reduced. Covering material 16 is engaged upon each of the members 14 and has its outer diameter or shape corresponding with the diameter or shape of the rim 12. Furthermore each of the covering members 16 is of a length so as to tightly fit in between the flanges 15 of the member 14. The covering member 16 may be of chamois, velvet or any other suitable material which is easy to keep clean. The spring spokes 11 are preferably made of leaf spring but may also be made of other material.

Vibrations in the steering column or mechanism are communicated to the hub 10 then to the spokes 11 and to the rim portion 12 of the steering wheel. An operator may hold the steering wheel at the covering portion 16 and the vibrations from the rim portion will not be transmitted to the hands of the person. The reason for this lies in the fact that the vibrations from the rim portion cannot be transmitted to the covering portions 16 since the absorbing material 14 will absorb and not transmit the vibrations.

In Figs. 4 and 5 a modified form of the device has been illustrated in which an arrangement is provided whereby all portions of the rim may be connected in a rigid unit or may be allowed to remain free so that vibrations are not transmitted to certain portions thereof. The construction of the steering wheel is substantially identical to the one previously described in Figs. 1-3 inclusive and similar parts may be recognized by the same reference numerals. The only difference lies in the fact that a collar 18 for each of the ends of the covering material 16, is slidably mounted upon the rim portion 12 and normally assumes a position so as to be located upon the rim portion immediately adjacent the flanges 15 of the absorption member 14. Each of the collars are provided with set screws 19 adapted to abut against the rim portion for holding the collars in fixed positions.

Should the sponge rubber material 14 or other absorption material deteriorate to such an extent that the covering members 16 are loose or for other reasons then the collars 18 may be slipped to positions as indicated by the dot and dash lines in Fig. 5 in which positions the edges thereof will overhang the edges of the covering material 16 and portions of the rim portion 12. The set screws 19 can then be adjusted so as to rigidly connect the cover in its new position. A sufficient number of set screws 19 are provided so that each of the collars may be rigidly connected with the rim portion and with the end of the covering member 16. Now all portions upon the steering wheel are rigidly connected in a unit so that even though the absorption material 14 has disintegrated the covering material 16 will be firmly connected and not loose.

In Fig. 6 another modified form of the invention has been disclosed which is very similar to the form illustrated in Figs. 1-3 inclusive except for the fact that the vibration absorption portions of the steering wheel are arranged on diametrically opposite sides and extend substantially 150° which distinguishes from the prior form in which four similar areas have been used. More particularly the steering wheel comprises a hub portion 20 connected with spokes 21 in turn connected with a rim portion 22. The rim portion 22 has a pair of reduced portions 23 which extend at the sides thereof and each being slightly less than 180°. Vibration absorption material 24 is mounted upon the reduced areas 23 and have end flanges 25 of diameters corresponding with the diameter or shape of the rim portion 22. Covering material 26 is engaged over the vibration absorption material 24 and has an outside diameter corresponding to the shape of the rim portion 22 and extends between the flanges similarly as previously described. In other respects this form of the invention is the same as the preferred form.

In Figs. 7-8 another modified form of the invention has been disclosed in which a steering wheel is illustrated comprising a hub portion 30 connected with spokes in turn connected with a rim portion 32. The spokes are composed of a pair of sections 31$^a$ and 31$^b$. These sections are respectively mounted upon the hub portion 30 and the rim 32. Each of these sections is formed with a reduced portion 33 directed towards each other and are split at 11'. A flat spring strip 11$^a$ is placed in the split sections 31$^a$ and 31$^b$ and secured in position by rivets 11$^b$, screws or the like, to form a resilient mounting for rim portion 32. Sponge rubber or other vibration material is arranged in the form of a bushing 34 and engaged upon the reduced portions 33 and provided with flanges 35 which have their outer diameters or shapes of the same size as corresponding dimensions of the spoke portions 31$^a$ and 31$^b$. Covering material 36 is engaged upon the bushing member 34 and has its outside diameters corresponding with the diameter of the shape of the spoke portions. The covering material 36 is of a length so as to fit in between the flanges 35. Vibrations from the hub portion 30 will not be transmitted to the rim portion 32 in that the material 34 will absorb the vibrations preventing them from passing from the spoke sections 31$^a$ to the spoke sections 31$^b$.

While I have shown and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:—

As an article of manufacture, a steering wheel provided with a rim portion having a reduced area covered with vibration absorbing material such as sponge rubber, said covering having end flanges, an outer friction cover on said sponge rubber having the ends thereof contacting said flanges, collars mounted upon and inset in said rim portion adjacent each of said flanges, means whereby said collars may be partially slid over said flanges and the ends of said outer friction covering when the latter becomes worn, and means for releasably locking said collars in positions of use.

THOMAS RITCHIE.